United States Patent
Chen et al.

(10) Patent No.: US 9,281,765 B2
(45) Date of Patent: Mar. 8, 2016

(54) MOTOR DECELERATION METHOD AND MOTOR DRIVING SYSTEM USING THE SAME

(71) Applicant: DELTA ELECTRONICS, INC., Taoyuan Hsien (TW)

(72) Inventors: Cheng-Te Chen, Taoyuan Hsien (TW); Chien-Yu Chi, Taoyuan Hsien (TW); Ting-Chung Hsieh, Taoyuan Hsien (TW)

(73) Assignee: DELTA ELECTRONICS, INC., Taoyuan Hsien (TW)

( * ) Notice: Subject to any disclaimer, the term of this patent is extended or adjusted under 35 U.S.C. 154(b) by 112 days.

(21) Appl. No.: 14/336,630

(22) Filed: Jul. 21, 2014

(65) Prior Publication Data

US 2015/0244291 A1    Aug. 27, 2015

Related U.S. Application Data

(60) Provisional application No. 61/944,162, filed on Feb. 25, 2014.

(30) Foreign Application Priority Data

Jun. 25, 2014   (TW) .............................. 103121828 A

(51) Int. Cl.
*H02P 3/00* (2006.01)
*H02P 3/14* (2006.01)
*H02P 3/18* (2006.01)
*H02P 29/02* (2006.01)

(52) U.S. Cl.
CPC .. *H02P 3/18* (2013.01); *H02P 3/14* (2013.01); *H02P 29/025* (2013.01)

(58) Field of Classification Search
CPC ......... H02P 29/025; H02P 3/16; H02P 29/04; H02P 3/12; H02P 3/26; H02P 3/22; H02P 3/18; H02P 3/14; B04B 9/10
USPC ......................................... 318/807, 376, 703
See application file for complete search history.

(56) References Cited

U.S. PATENT DOCUMENTS

2012/0206071 A1*   8/2012   Keen ......................... B04B 9/10
                                                                       318/376

\* cited by examiner

*Primary Examiner* — Bentsu Ro
*Assistant Examiner* — Zemenay Truneh
(74) *Attorney, Agent, or Firm* — Kirton McConkie; Evan R. Witt

(57) ABSTRACT

A motor deceleration method for a motor driving system is provided. The motor driving system outputs a driving signal containing a voltage value, a current value and a frequency value for driving a motor. When a deceleration of the motor is launched, the descent speeds of the voltage value and the frequency value are controlled according to a preset deceleration time period. Then, a voltage compensation value is generated according to a result of comparing the current value with a preset current level, and the voltage value is increased according to the voltage compensation value, so that the current value is increased to the preset current level. According to a frequency compensation value, the current value is increased to and maintained at the preset current level. Finally, the rotating speed of the motor is gradually decreased to a preset speed.

14 Claims, 5 Drawing Sheets

MOTOR DECELERATION METHOD AND MOTOR DRIVING SYSTEM USING THE SAME

CROSS-REFERENCE TO RELATED APPLICATION

This application claims the benefit of U.S. Provisional Application No. 61/944,162 filed on Feb. 25, 2014, and entitled "TRACTION ENERGY CONTROLLER WITH VARIABLE OUTPUT CURRENT OF OPEN LOOP CONTROL OF VARIABLE FREQUENCY DRIVES FOR FAST DECELERATION OF INDUCTION MACHINE", the entirety of which is hereby incorporated by reference.

FIELD OF THE INVENTION

The present invention relates to a motor deceleration method and a motor driving system, and more particularly to a motor deceleration method and a motor driving system for reducing the speed of a motor to a preset speed (including the zero speed) in a short time period.

BACKGROUND OF THE INVENTION

FIG. 1 is a circuit block diagram of a conventional motor driving system. As shown in FIG. 1, the conventional motor driving system 1 is electrically connected with an alternating current (AC) power source 2 and a motor 3. The motor driving system 1 may receive an input voltage from the AC power source 2 and convert the input voltage into a driving signal for controlling operations of the motor 3. The driving signal contains an output voltage, an output current and an output frequency. The motor driving system 1 comprises a motor driver 4 and a braking device 5. The motor driver 4 may receive an input voltage from the AC power source 2 and convert the input voltage into the driving signal for controlling operations of the motor 3. The motor driver 4 employs a pulse width modulation (PWM) technology to change the frequency and amplitude of the output voltage of the driving signal, which is outputted from a converter (not shown) of the motor driver 4. Consequently, the rotating speed of the motor 3 is correspondingly adjusted. When the frequency of the output voltage is increased, the motor 3 is accelerated. Meanwhile, the electrical energy is transferred from the AC power source 2 to the motor 3 through the motor driver 4 so as to provide required kinetic energy for accelerating the motor 3. When the frequency of the output voltage is decreased, the motor 3 is decelerated. Meanwhile, the kinetic energy of the motor 3 is converted into electrical energy by the induction generator action. The electrical energy is fed back to the motor driver 4, or the electrical energy is converted into thermal energy to be dissipated away.

For assisting in energy conversion during the deceleration period, the electrical energy fed back to the motor driver 4 is consumed by the braking device 5 during the deceleration of the motor 3. The braking device 5 may be a braking resistor or a braking energy regenerator. The braking resistor is configured to convert the feedback kinetic energy during the deceleration of the motor 3 into the thermal energy to be dissipated away. The braking energy regenerator is configured to convert the feedback kinetic energy during the deceleration of the motor 3 into the AC electrical energy that flows back to the AC power source 2.

However, the braking resistor will increase the cost and may induce some dangerous risks under some kind of environments. For example, in the environment of a large number of inflammable materials, a fire accident will occur due to the excessive heat generated by the braking resistor. On the other hand, if the braking energy regenerator is employed, the cost will be increased a lot. Besides, in the situation of immediately stopping the motor for an emergency event, if the feedback kinetic energy during the deceleration of the motor 3 is not converted or consumed completely, the motor driver 4 will launch self-protection functions to prevent damage. Under this circumstance, the motor driver 4 is readily suffered from shutdown or damage. However, if the braking device 5 is not included in the motor driving system 1, it will take a long time (e.g. 40 seconds) for stopping the motor 3 from a rated speed.

For solving the above drawbacks, a stage-type control method is used to decrease the output frequency in order to decelerate the motor. This stage-type control method can effectively stop the motor in a short time period without externally connecting any braking device. However, the performance of this method depends on the configurations and specifications of the motor. In other words, the optimum operating frequency is varied with the different structure of the motor or circuit layout of the whole system. Therefore, the decrement of the frequency in the stage-type control method is not easy to be determined. Besides, if the frequency decrement is incorrectly set, the deceleration effect will be reduced a lot.

Therefore, there is a need of providing a motor deceleration method and a motor driving system for stopping the motor in a short time period in order to avoid the above drawbacks.

SUMMARY OF THE INVENTION

The present invention provides a motor deceleration method and a motor driving system using the motor deceleration method. During the deceleration of the motor, a traction energy controller issues a voltage compensation value and a frequency compensation value according to a preset current level. Consequently, the voltage value and the frequency value of the driving signal from the motor driver to the motor will be changed. By the motor deceleration method and the motor driving system of the present invention, the rotating speed of the motor can be quickly reduced to the preset speed, and the capability of consuming the feedback electrical energy by the motor driving system during the deceleration of the motor can be increased. In comparison with the conventional motor driving system, the motor driving system of the present invention is cost-effective and has better performance.

In accordance with an aspect of the present invention, there is provided a motor deceleration method for a motor driving system. The motor driving system is configured to drive a motor. The motor driving system includes a motor driver, a current sensor and a traction energy controller. The motor driver includes a converter and a voltage-regulator capacitor electrically connected with an input terminal of the converter. The converter outputs a driving signal containing a voltage value, a current value and a frequency value for driving the motor. The motor deceleration method includes the following steps. Firstly, when a deceleration of the motor is launched, the descent speeds of the voltage value and the frequency value of the driving signal are controlled according to a preset deceleration time period. Then, the traction energy controller issues a voltage compensation value according to a result of comparing the current value with a preset current level, and increases the voltage value according to the voltage compensation value, so that the current value is increased to the preset current level. The traction energy controller further provides a frequency compensation value to control the frequency value. According to the frequency compensation value, an electrical energy is fed back from the motor to the motor driving system to adjust a DC voltage of the voltage-regulator capacitor, so that the voltage value is increased and the current value is correspondingly increased to and maintained at the preset current level. If the current value fails to be maintained at the preset current level according to the frequency compensation value and the voltage compensation value, the traction energy controller gradually decreases the voltage compensation value to zero, so that a rotating speed of the motor is gradually decreased to a preset speed.

In accordance with another aspect of the present invention, there is provided a motor driving system for driving a motor. The motor driving system includes a converter, a voltage-regulator capacitor, a current sensor, a main controller, and a traction energy controller. The converter is electrically connected with the motor for generating a driving signal to drive the motor. The driving signal contains a voltage value, a current value and a frequency value. The voltage-regulator capacitor is electrically connected with an input terminal of the converter. The current sensor is electrically connected with an output terminal of the converter for sensing the current value and generating a current detecting signal. The main controller is electrically connected with the converter for outputting a control signal to control the converter. The traction energy controller is electrically connected with the current sensor and the main controller. When a deceleration of the motor is launched by the main controller, the traction energy controller issues a voltage compensation value to the main controller according to a result of comparing the current detecting signal with a preset current level, so that the voltage value of the driving signal is increased by the main controller and the current value is increased to the preset current level. When the deceleration of the motor is launched, the traction energy controller further provides a frequency compensation value to the main controller, so that the frequency value is correspondingly changed by the main controller. According to the frequency compensation value, an electrical energy is fed back from the motor to the motor driving system to adjust a DC voltage of the voltage-regulator capacitor, so that the voltage value is increased and the current value is correspondingly increased to and maintained at the preset current level. If the current value fails to be maintained at the preset current level according to the frequency compensation value and the voltage compensation value, the voltage compensation value is gradually decreased to zero, so that a rotating speed of the motor is decreased to a preset speed.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
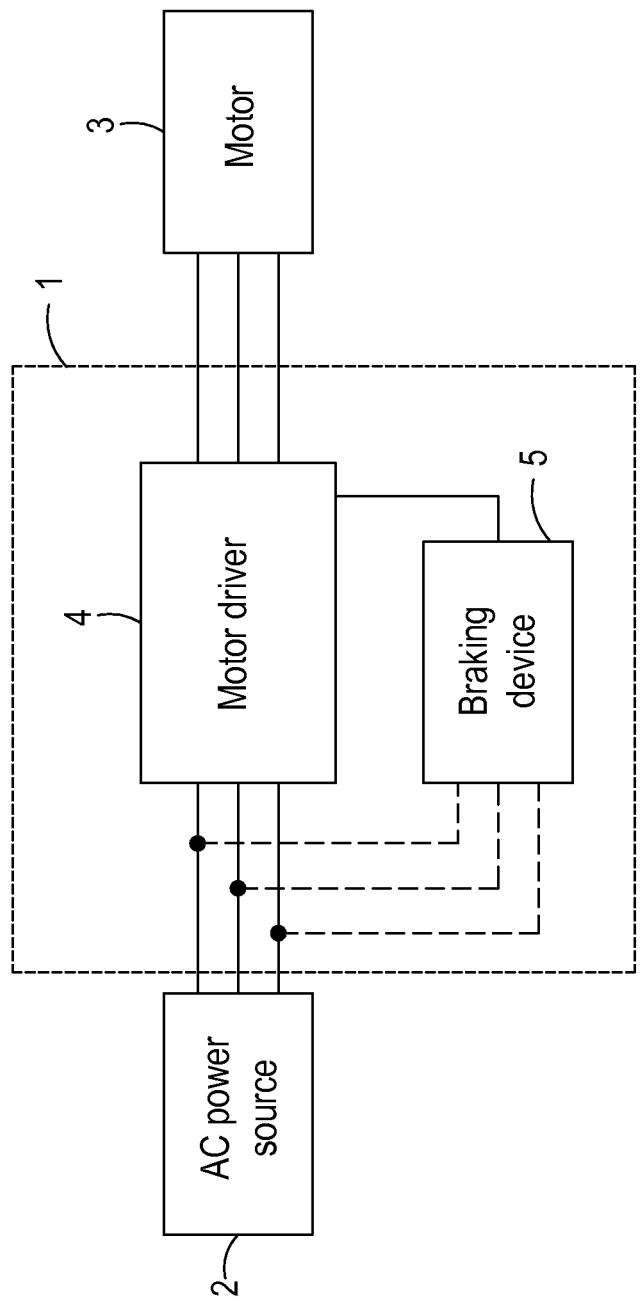
FIG. 1 is a circuit block diagram of a conventional motor driving system.
Figure 2:
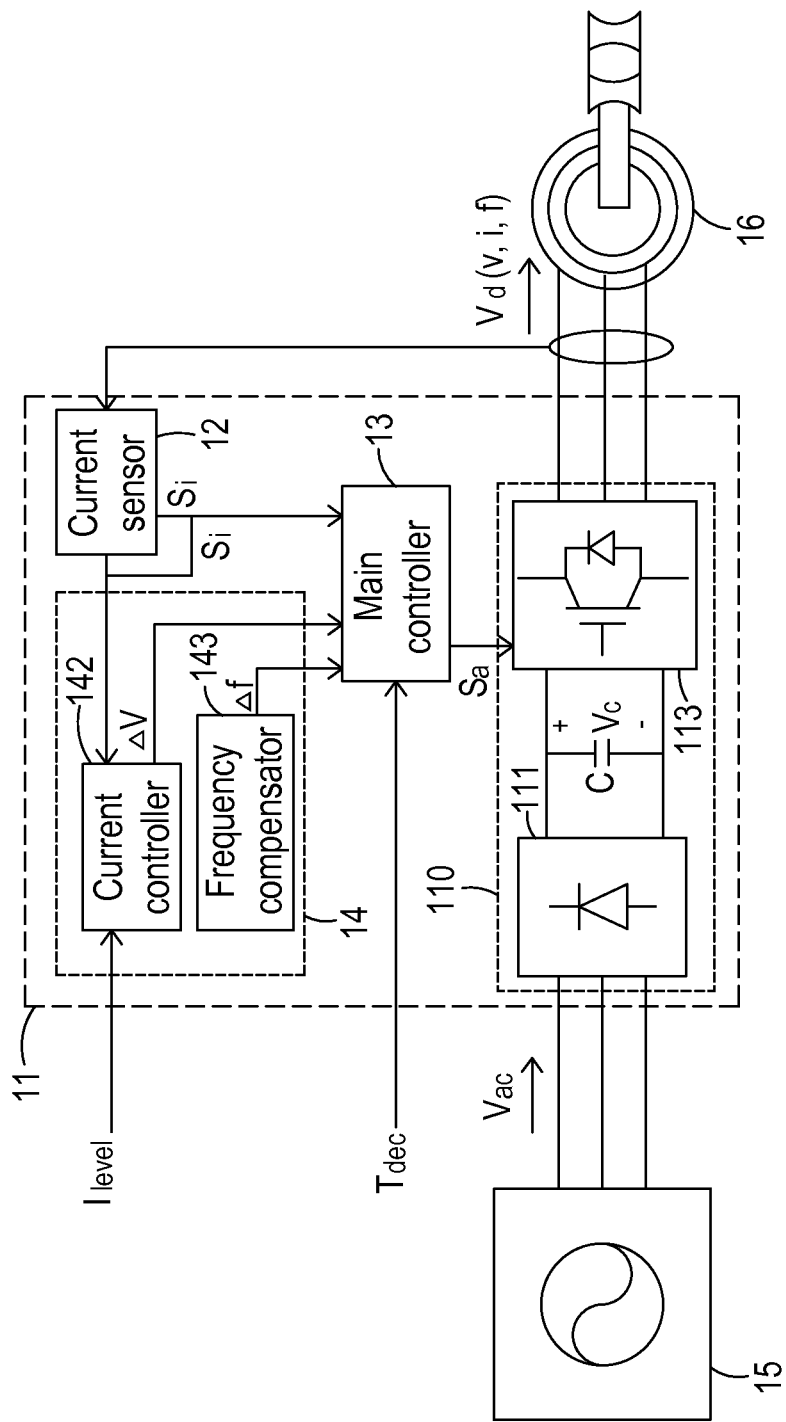
FIG. 2 is a circuit block diagram of a motor driving system according to an embodiment of the present invention.

FIG. 2 is a circuit block diagram of a motor driving system according to an embodiment of the present invention. As shown in FIG. 2, the motor driving system 11 is electrically connected with an AC power source 15 (e.g. a three-phase AC power source) and a motor 16. The motor driving system 11 may receive an input voltage $V_{ac}$ from the three-phase AC power source 15 and convert the input voltage $V_{ac}$ into a driving signal $V_d$ for controlling operations of the motor 16. An example of the motor 16 includes but is not limited to a three-phase induction motor.

The motor driving system 11 comprises a motor driver 110, a current sensor 12, a main controller 13, and a traction energy controller 14. The input terminal of the motor driver 110 is electrically connected with the three-phase AC power source 15. The output terminal of the motor driver 110 is electrically connected with the motor 16. The motor driver 110 may receive the input voltage $V_{ac}$ from the three-phase AC power source 15 and convert the input voltage $V_{ac}$ into the driving signal $V_d$ for controlling operations of the motor 16. The motor driver 110 further comprises a rectifier circuit 111, a voltage-regulator capacitor C, and a converter 113. The input terminal of the rectifier circuit 111 receives the input voltage $V_{ac}$. The output terminal of the rectifier circuit 111 is electrically connected with the voltage-regulator capacitor C. The rectifier circuit 111 is used for converting the input voltage $V_{ac}$ into a transient DC voltage so as to charge the voltage-regulator capacitor C. When the voltage-regulator capacitor C reaches the saturation state, the voltage-regulator capacitor C may provide a stable DC voltage $V_c$. The input terminal of the converter 113 is electrically connected with the voltage-regulator capacitor C. The output terminal of the converter 113 is electrically connected with the motor 16. The converter 113 may convert the DC voltage $V_c$ into the driving signal $V_d$ for controlling operations of the motor 16.

Generally, the driving signal $V_d$ contains a voltage value v, a current value i and a frequency value f. By changing the voltage value v, and the frequency value f of the driving signal $V_d$, the rotating speed of the motor 16 is correspondingly adjusted. For example, when the frequency value f of the driving signal $V_d$ is decreased, the motor 16 is decelerated. Meanwhile, the kinetic energy of the motor 16 is converted into electrical energy by the induction generator action. The electrical energy is returned back to the motor driving system 11. Consequently, the DC voltage $V_c$ of the voltage-regulator capacitor C is increased. Moreover, by the wires and electronic components of the motor driving system 11, the electrical energy is converted into thermal energy to be dissipated. Moreover, during the deceleration of the motor 16, if the descent rate of the frequency value f of the driving signal $V_d$ is faster (i.e. the descent slope of the frequency value f of the driving signal $V_d$ is larger), the descent speed of the motor 16 is larger. Under this circumstance, the magnitude of the electrical energy fed back to the motor driving system 11 is increased. Moreover, during the deceleration of the motor 16, if the voltage value v of the driving signal $V_d$ is larger, the current value i corresponding to the voltage value v is larger. Since the current value i is increased, the capability of consuming the feedback kinetic energy by the motor driving system 11 during the deceleration of the motor 16 will be correspondingly increased.

The input terminal of the current sensor 12 is electrically connected with the output terminal of the motor driver 110. The output terminal of the current sensor 12 is electrically connected with the main controller 13 and the traction energy controller 14. The current sensor 12 may detect the current value i, and output a current detecting signal $S_i$ to the main controller 13 and the traction energy controller 14 according to the detecting result.

The main controller 13 is electrically connected with the motor driver 110 and the traction energy controller 14. The main controller 13 issues a control signal $S_a$ to the converter 113. According to the control signal $S_a$, plural transistors (not shown) of the converter 113 are selectively switched by a pulse width modulation (PWM) control mechanism. Consequently, the converter 113 generates the driving signal $V_d$. Moreover, during the acceleration or the constant speed rotation of the motor 16, the main controller 13 may maintain the current value i of the driving signal $V_d$ to be higher than a rated current level. Moreover, when the deceleration of the motor 16 is launched, a preset deceleration time period $T_{dec}$ is received by the main controller 13. The preset deceleration time period $T_{dec}$ is set by the user to indicate the time period of decelerating the speed of the motor 16 to a preset speed (e.g. zero). According to the preset deceleration time period $T_{dec}$, the main controller 13 adjusts the control signal $S_a$. Consequently, the descent speeds of the voltage value v and the frequency value f of the driving signal $V_d$ from the converter 113 are adjusted according to the preset deceleration time period $T_{dec}$. That is, the descent slopes of the voltage value v and the frequency value f are adjusted according to the preset deceleration time period $T_{dec}$.

The traction energy controller 14 is electrically connected with the current sensor 12 and the main controller 13. When the deceleration of the motor 16 is launched, the traction energy controller 14 receives a preset current level $I_{level}$. The preset current level $I_{level}$ is defined by the user. In addition, the preset current level $I_{level}$ may be defined as a specified percentage (e.g. 50% or 100%) of the rated current of the motor driver 110. When the deceleration of the motor 16 is launched, the traction energy controller 14 compares the preset current level $I_{level}$ with the current detecting signal $S_i$, and issues a voltage compensation value $\Delta V$ to the main controller 13 according to comparing result. According to the voltage compensation value $\Delta V$, the control signal $S_a$ is correspondingly adjusted by the main controller 13. Consequently, the voltage value v of the driving signal $V_d$ from the converter 113 is increased, and the current value i is increased to the preset current level $I_{level}$. When the deceleration of the motor 16 is launched, if the current value i is lower than the preset current level $I_{level}$, the traction energy controller 14 will gradually increase the voltage compensation value $\Delta V$.

Moreover, when the deceleration of the motor 16 is launched, the real increment of the voltage value v of the driving signal $V_d$ from the converter 113 is determined according to the magnitude of the DC voltage $V_c$ of the voltage-regulator capacitor C. For increasing the voltage value v to increase and maintain the current value i to the preset current level $I_{level}$ the traction energy controller 14 further provides a frequency compensation value $\Delta f$ to the main controller 13. According to the frequency compensation value $\Delta f$, the control signal $S_a$ is correspondingly adjusted by the main controller 13. Consequently, the frequency value f of the driving signal $V_d$ from the converter 113 is adjusted, and the electrical energy of the motor 16 to be fed back to the motor driving system 11 is changed. Meanwhile, the magnitude of the DC voltage $V_c$ of the voltage-regulator capacitor C is adjusted. According to the voltage compensation value $\Delta V$, the converter 113 may increase the voltage value v, and thus the current value i is increased to and maintained at the preset current level $I_{level}$. If the current value i is lower than the preset current level $I_{level}$, the frequency compensation value $\Delta f$ is decreased, so that the descent speed of the frequency value f of the driving signal $V_d$ is increased. In other words, the descent slope of the frequency value f is increased. However, the descent slope (or the descent speed) of the frequency value f is lower than or equal to the descent slope (or the descent speed) of the frequency value f that is adjusted according to the preset deceleration time period $T_{dec}$.

Moreover, when the deceleration of the motor 16 is launched, if the current value i reaches the preset current level $I_{level}$, the traction energy controller 14 will stop increasing the voltage compensation value $\Delta V$. Moreover, when the current value i reaches the preset current level $I_{level}$, the traction energy controller 14 will increase the frequency compensation value $\Delta f$. Consequently, the descent slope (or the descent speed) of the frequency value f is decreased. Under this circumstance, the current value i is maintained at the preset current level $I_{level}$.

In some embodiments, the traction energy controller 14 comprises a current controller 142 and a frequency compensator 143. The current controller 142 is electrically connected with the current sensor 12. When the deceleration of the motor 16 is launched, the current controller 142 receives the preset current level $I_{level}$. Moreover, when the deceleration of the motor 16 is launched, the current controller 142 compares the preset current level $I_{level}$ with the current detecting signal $S_i$, and issues the voltage compensation value $\Delta V$ to the main controller 13 according to comparing result. The frequency compensator 143 is electrically connected with the main controller 13. When the deceleration of the motor 16 is launched, the frequency compensator 143 issues the frequency compensation value $\Delta f$ to the main controller 13.

Figure 3:
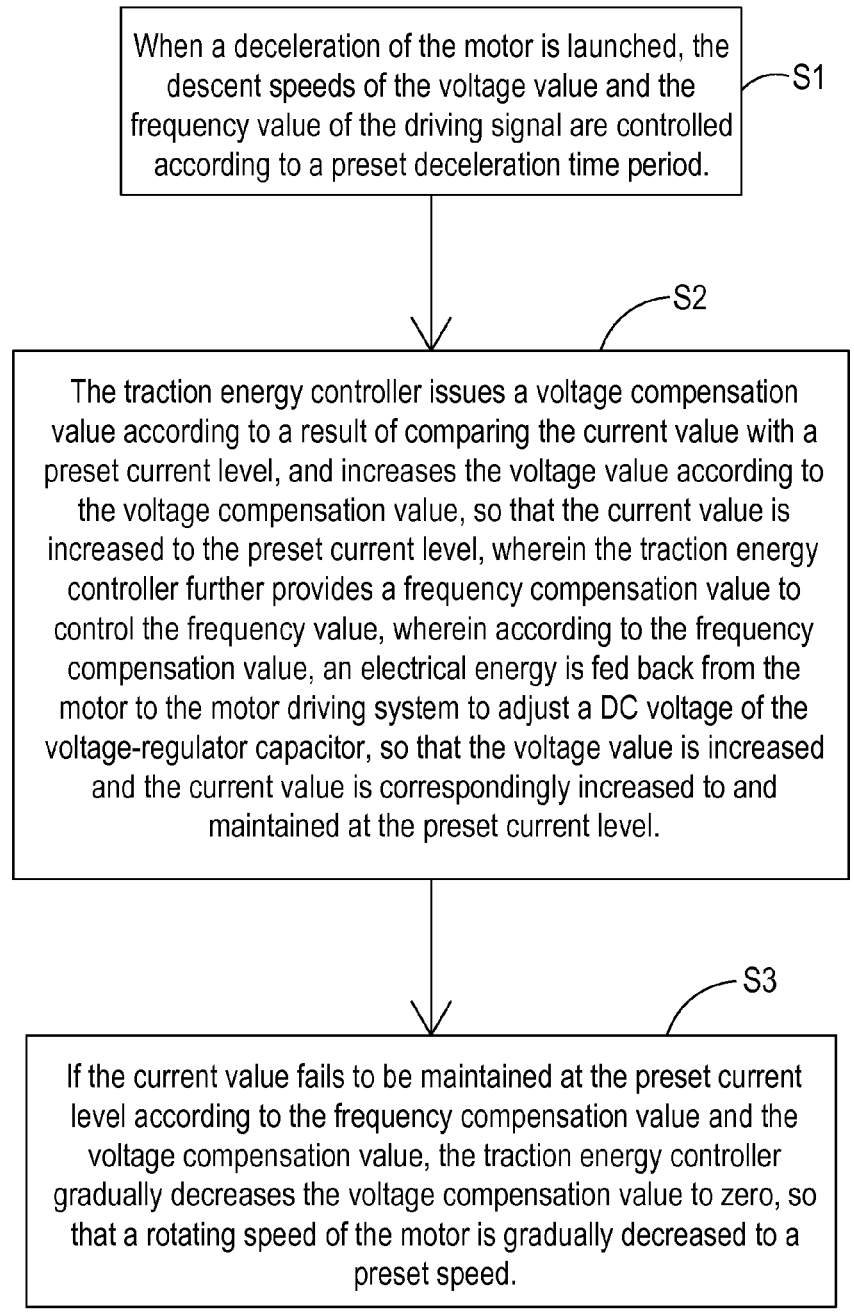
FIG. 3 is a flowchart illustrating the operations of the motor driving system according to the embodiment of the preset invention.
Figure 4:
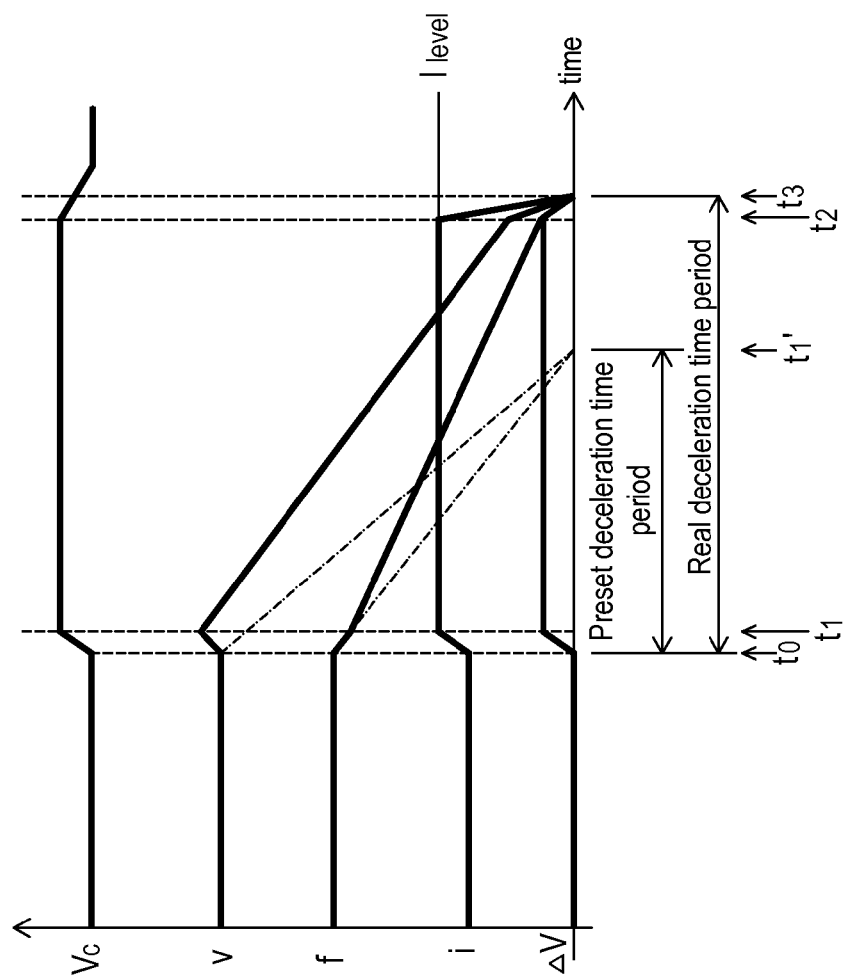
FIG. 4 is a time diagram illustrating associated voltage, current and frequency processed by the motor driving system according to the embodiment of the preset invention, in which the preset current level is defined as 50% of the rated current of the motor driver.

Hereinafter, the operations of the motor driving system 11 will be illustrated with reference to FIGS. 2, 3 and 4. FIG. 3 is a flowchart illustrating the operations of the motor driving system according to the embodiment of the preset invention. FIG. 4 is a time diagram illustrating associated voltage, current and frequency processed by the motor driving system according to the embodiment of the preset invention, in which the preset current level is defined as 50% of the rated current of the motor driver.

Firstly, in the step S1, the motor driving system 11 receives a deceleration command at an initial time point t0, and a deceleration of the motor 16 is launched. According to the preset deceleration time period $T_{dec}$, the descent speeds of the voltage value v and the frequency value f of the driving signal $V_d$ from the converter 113 are adjusted by the main controller 13 according to the preset deceleration time period $T_{dec}$.

Then, in the step S2, the current controller 142 of the traction energy controller 14 compares the preset current level $I_{level}$ with the current detecting signal $S_i$, and issues a voltage compensation value $\Delta V$ to the main controller 13 according to comparing result. According to the voltage compensation value $\Delta V$ and the current detecting signal $S_i$, the control signal $S_a$ is correspondingly adjusted by the main controller 13. Consequently, the voltage value v of the driving signal $V_d$ is increased, and the current value i corresponding to the voltage value v is increased to the preset current level $I_{level}$. The frequency compensator 143 further issues the frequency compensation value $\Delta f$ to the main controller 13. According to the frequency compensation value $\Delta f$, the control signal $S_a$ is correspondingly adjusted by the main controller 13. Consequently, the frequency value f of the driving signal $V_d$ from the converter 113 is adjusted, and the electrical energy of the motor 16 to be fed back to the motor driving system 11 is changed. Meanwhile, the magnitude of the DC voltage $V_c$ of the voltage-regulator capacitor C is adjusted. According to the voltage compensation value $\Delta V$, the converter 113 may increase the voltage value v, and thus the current value i is increased to and maintained at the preset current level $I_{level}$ (i.e. from the initial time point t0 to a first time point t1). In this embodiment, the preset current level $I_{level}$ is defined as 50% of the rated current of the motor driver 110.

In the step S2, according to the voltage compensation value $\Delta V$ from the current controller 142, the voltage value v from the converter 113 is increased, and the current value i is correspondingly increased to the preset current level $I_{level}$. Under this circumstance, the capability of consuming the feedback electrical energy by the motor driving system 11 during the deceleration of the motor 16 will be correspondingly enhanced. However, since the feedback electrical energy is consumed by the motor driving system 11, the magnitude of the DC voltage $V_c$ of the voltage-regulator capacitor C is decreased. Moreover, the real increment of the voltage value v of the driving signal $V_d$ from the converter 113 is determined according to the magnitude of the DC voltage $V_c$ of the voltage-regulator capacitor C. For increasing the voltage value v and thus increasing the current value i to the preset current level $I_{level}$, the frequency compensator 143 further issues the frequency compensation value $\Delta f$ to adjust the frequency value f of the driving signal $V_d$. By changing the magnitude of the electrical energy of the motor 16 to be fed back to the motor driving system 11, the magnitude of the DC voltage $V_c$ of the voltage-regulator capacitor C is adjusted. Since the voltage value v is increased, the current value i is increased to and maintained at the preset current level $I_{level}$.

Moreover, in the step S2, if the current value i does not reach the preset current level $I_{level}$, the voltage compensation value $\Delta V$ is gradually increased by the current controller 142, and the frequency compensation value $\Delta f$ is decreased by the frequency compensator 143. Consequently, the descent speed of the frequency value f of the driving signal $V_d$ is increased. In other words, the descent slope of the frequency value f is increased (i.e. from the initial time point t0 to the first time point t1). However, the descent slope (or the descent speed) of the frequency value f is lower than or equal to the descent slope (or the descent speed) of the frequency value f that is adjusted by the main controller 13 according to the preset deceleration time period $T_{dec}$. On the other hand, when the current value i reaches the preset current level $I_{level}$, the current controller 142 stops increasing the voltage compensation value $\Delta V$, and the frequency compensation value $\Delta f$ is increased by the frequency compensator 143. Consequently, the descent slope (or the descent speed) of the frequency value f is decreased (i.e. from the first time point t1 to a second time point t2). By changing the magnitude of the electrical energy of the motor 16 to be fed back to the motor driving system 11, the magnitude of the DC voltage $V_c$ of the voltage-regulator capacitor C is adjusted. Since the voltage value v is increased, and thus the current value i is increased to and maintained at the preset current level $I_{level}$.

Then, the step S3 is performed. If the current value i fails to be maintained at the preset current level $I_{level}$ according to the frequency compensation value $\Delta f$ and the voltage compensation value $\Delta V$, the voltage compensation value $\Delta V$ is gradually decreased to zero by the current controller 142. Meanwhile, the rotating speed of the motor 16 is decreased to a preset speed (e.g. zero). As shown in FIG. 4, the rotating speed of the motor 16 is gradually decreased to zero from the second time point t2 to a third time point t3. That is, the rotation of the motor 16 is stopped.

In the step S3, if the current value i fails to be maintained at the preset current level $I_{level}$ according to the frequency compensation value $\Delta f$ and the voltage compensation value $\Delta V$, the frequency compensation value $\Delta f$ is decreased by the frequency compensator 143 again in order to increase the current value i to the preset current level $I_{level}$ as much as possible. Consequently, the descent speed of the frequency value f of the driving signal $V_d$ increased. In other words, the descent slope of the frequency value f is increased. Consequently, the electrical energy of the motor 16 is fed back to the motor driving system 11 so as to increase the magnitude of the DC voltage $V_c$ of the voltage-regulator capacitor C. However, in fact, the current value i cannot be maintained at the preset current level $I_{level}$ according to the frequency compensation value $\Delta f$. Consequently, the current value i is gradually decreased from the second time point t2 to a third time point t3. However, the descent slope (or the descent speed) of the frequency value f is still lower than or equal to the descent slope (or the descent speed) of the frequency value f that is adjusted by the main controller 13 according to the preset deceleration time period $T_{dec}$.

From the above descriptions, when the deceleration of the motor 16 is launched, the descent speeds of the voltage value v and the frequency value f of the driving signal $V_d$ are adjusted according to the preset deceleration time period $T_{dec}$ (see the dashed line shown in FIG. 4). In fact, the descent speeds of the voltage value v and the frequency value f are determined according to the voltage compensation value $\Delta V$ and the frequency compensation value $\Delta f$ which are outputted from the traction energy controller 14. Consequently, the real time period of decreasing the speed of the motor 16 to the preset speed is longer than or equal to the preset deceleration time period $T_{dec}$. As shown in FIG. 4, the preset deceleration time period $T_{dec}$ is from the initial time point t0 to a preset time point t1', and the real deceleration time period is from the initial time point t0 to the third time point.

In the above embodiment, the preset current level $I_{level}$ is defined as 50% of the rated current of the motor driver 110. It is noted that the definition of the preset current level $I_{level}$ is not restricted.

Figure 5:
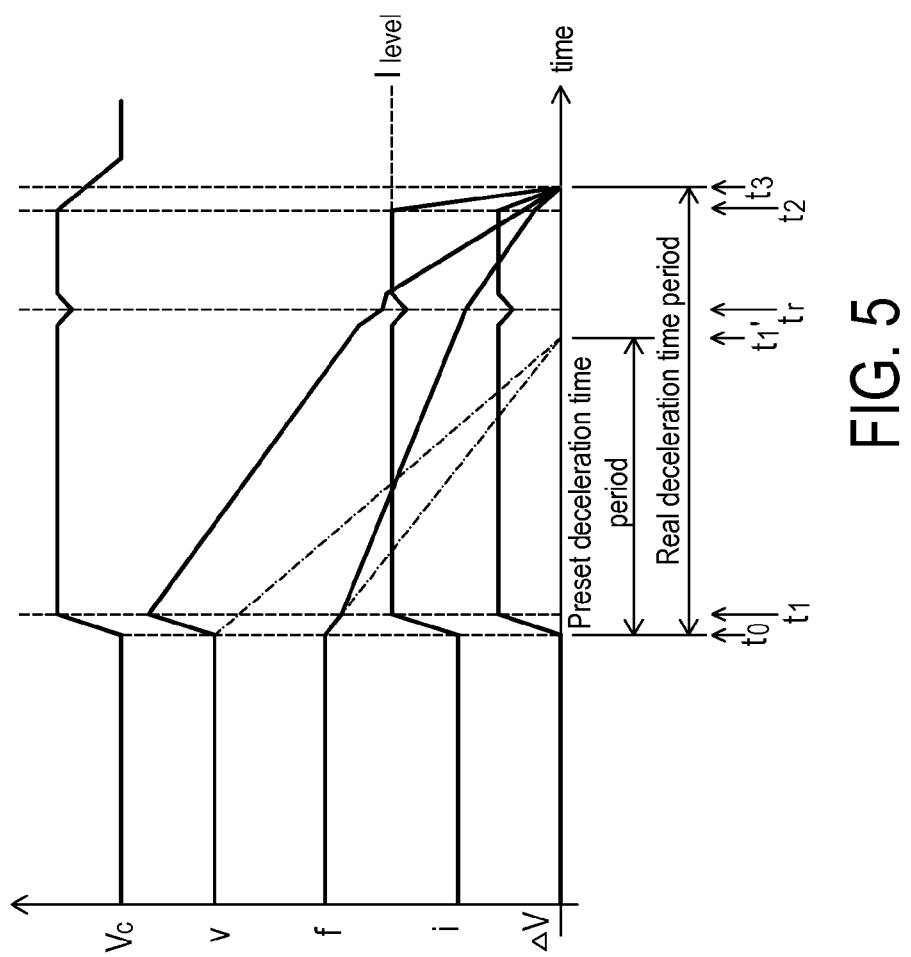
FIG. 5 is a time diagram illustrating associated voltage, current and frequency processed by the motor driving system according to the embodiment of the preset invention, in which the preset current level is defined as 100% of the rated current of the motor driver.

FIG. 5 is a time diagram illustrating associated voltage, current and frequency processed by the motor driving system according to the embodiment of the preset invention, in which the preset current level is defined as 100% of the rated current of the motor driver. In this embodiment, the preset current level $I_{level}$ is defined as 100% of the rated current of the motor driver 110. In comparison with the situation that the preset current level $I_{level}$ is defined as 50% of the rated current of the motor driver 110, the capability of consuming the feedback electrical energy by the motor driving system 11 during the deceleration of the motor 16 in this situation (i.e. the preset current level $I_{level}$ is defined as 50% of the rated current of the motor driver 110) is enhanced. In other words, in the situation that the preset current level $I_{level}$ is defined as 100% of the rated current of the motor driver 110, the real deceleration time period is shorter (i.e. from the initial time point t0 to the third time point t3). As the preset current level $I_{level}$ is increased, the performance of decelerating the motor 16 by the motor driving system 11 will be enhanced.

Please refer to FIGS. 2 and 5. Firstly, the motor driving system 11 receives a deceleration command at an initial time point to, and deceleration of the motor 16 is launched. According to the preset deceleration time period $T_{dec}$, the descent speeds of the voltage value v and the frequency value f of the driving signal $V_d$ from the converter 113 are decreased by the main controller 13 according to the preset deceleration time period $T_{dec}$.

Then, the current controller 142 of the traction energy controller 14 compares the preset current level $I_{level}$ with the current detecting signal $S_i$, and issues a voltage compensation value ΔV to the main controller 13 according to comparing result. According to the voltage compensation value ΔV and the current detecting signal $S_i$, the control signal $S_a$ is correspondingly adjusted by the main controller 13. Consequently, the voltage value v of the driving signal $V_d$ is increased, and the current value i corresponding to the voltage value v is increased to the preset current level $I_{level}$. The frequency compensator 143 further issues the frequency compensation value Δf to the main controller 13. According to the frequency compensation value Δf, the control signal $S_a$ is correspondingly adjusted by the main controller 13. Consequently, the frequency value f of the driving signal $V_d$ from the converter 113 is adjusted, and the electrical energy of the motor 16 to be fed back to the motor driving system 11 is changed. Meanwhile, the magnitude of the DC voltage $V_c$ of the voltage-regulator capacitor C is adjusted. According to the voltage compensation value ΔV, the converter 113 may increase the voltage value v, and thus the current value i is increased to and maintained at the preset current level $I_{level}$ (i.e. from the initial time point t0 to a first time point W. Since the magnitude of the preset current level $I_{level}$ of FIG. 5 is higher than the magnitude of the preset current level $I_{level}$ of FIG. 4, the changes (in unit time) of the voltage compensation value ΔV, the voltage value v and the DC voltage $V_c$ of the voltage-regulator capacitor C of FIG. 5 (i.e. from the initial time point t0 to the first time point t1) are higher than those of FIG. 4.

While the current value i is maintained at the preset current level $I_{level}$ (i.e. from the first time point t1 to a second time point t2), the current value i at a specified time point (e.g. the time point tr) may be lower than the preset current level $I_{level}$ because the magnitude of the preset current level $I_{level}$ is higher. Under this circumstance, the frequency compensation value Δf has to be decreased. Consequently, the descent slope of the frequency value f is increased, and the current value i is continuously maintained at the preset current level $I_{level}$. However, the descent slope of the frequency value f is still lower than or equal to the descent slope of the frequency value f that is adjusted by the main controller 13 according to the preset deceleration time period $T_{dec}$.

Finally, if the current value i fails to be maintained at the preset current level $I_{level}$ according to the frequency compensation value Δf and the voltage compensation value ΔV, the voltage compensation value ΔV is gradually decreased to zero by the current controller 142. Meanwhile, the rotating speed of the motor 16 is decreased to a preset speed. As shown in FIG. 5, the rotating speed of the motor 16 is gradually decreased to zero from the second time point t2 to a third time point t3. That is, the rotation of the motor 16 is stopped.

In the above embodiments, the traction energy controller 14 of the motor driving system 11 of the present invention compares the preset current level $I_{level}$ with the current value i of the driving signal $V_d$. According to comparing result, the voltage value v of the driving signal $V_d$ is adaptively compensated. Consequently, the current value i associated with the capability of consuming the feedback electrical energy by the motor driving system 11 during the deceleration of the motor 16 will be adjusted. Moreover, the frequency value f is compensated according to the frequency compensation value Δf. Consequently, the magnitude of the DC voltage $V_c$ of the voltage-regulator capacitor C is sufficient to have the current value i reach the preset current level $I_{level}$. In other words, the motor driving system 11 of the present invention can increase the capability of consuming the feedback electrical energy by the motor driving system 11 during the deceleration of the motor 16 without using a braking device, additionally detecting the DC voltage $V_c$ of the voltage-regulator capacitor C and additionally detecting the rotating speed of the motor 16. Under this circumstance, the motor driving system 11 of the present invention can be operated in an open loop control mode to reduce the speed of the motor 16 in a short time period (e.g. 4~12 seconds) to a preset speed. In the conventional motor driving system without the braking device, it takes about 40 seconds to stop the motor from the rated rotating speed. In other words, the motor driving system 11 of the present invention can reduce the speed of the motor 16 in a faster manner.

From the above descriptions, the present invention provides a motor deceleration method and a motor driving system using the motor deceleration method. During the deceleration of the motor, the traction energy controller issues a voltage compensation value and a frequency compensation value according to a preset current level. Consequently, the voltage value and the frequency value of the driving signal from the motor driver to the motor will be changed. By the motor deceleration method and the motor driving system of the present invention, the rotating speed of the motor can be quickly reduced to the preset speed, and the capability of consuming the feedback electrical energy by the motor driving system during the deceleration of the motor can be increased. Therefore, the motor deceleration method and the motor driving system of the present invention have industrial values.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A motor deceleration method for a motor driving system, the motor driving system being configured to drive a motor, the motor driving system comprising a motor driver, a current sensor and a traction energy controller, the motor driver comprising a converter and a voltage-regulator capacitor electrically connected with an input terminal of the converter, the converter outputting a driving signal containing a voltage value, a current value and a frequency value for driving the motor, the motor deceleration method comprising steps of:
 (a) controlling descent speeds of the voltage value and the frequency value of the driving signal according to a preset deceleration time period when a deceleration of the motor is launched;
 (b) the traction energy controller issuing a voltage compensation value according to a result of comparing the current value with a preset current level, and increasing the voltage value according to the voltage compensation value, so that the current value is increased to the preset current level, wherein the traction energy controller further provides a frequency compensation value to control the frequency value, wherein according to the frequency compensation value, an electrical energy is fed back from the motor to the motor driving system to adjust a DC voltage of the voltage-regulator capacitor, so that the voltage value is increased and the current value is correspondingly increased to and maintained at the preset current level; and (c) if the current value fails to be maintained at the preset current level according to the frequency compensation value and the voltage compensation value, the traction energy controller gradually decreasing the voltage compensation value to zero, so that a rotating speed of the motor is gradually decreased to a preset speed.

2. The motor deceleration method according to claim 1, wherein in the step (b), if the current value is lower than the preset current level, the voltage compensation value is gradually increased.

3. The motor deceleration method according to claim 1, wherein in the step (b), if the current value reaches the preset current level, the voltage compensation value is no longer increased.

4. The motor deceleration method according to claim 1, wherein in the step (b), if the current value is lower than the preset current level, the frequency compensation value is decreased, so that the descent speed of the frequency value is increased, wherein the descent speed of the frequency value is lower than or equal to the descent speed of the frequency value that is adjusted according to the preset deceleration time period.

5. The motor deceleration method according to claim 1, wherein in the step (b), if the current value reaches the preset current level, the frequency compensation value is increased, so that a descent speed of the frequency value is decreased.

6. The motor deceleration method according to claim 1, wherein in the step (c), if the current value fails to be maintained at the preset current level according to the frequency compensation value and the voltage compensation value, the frequency compensation value is decreased and the descent speed of the frequency value is increased, so that the electrical energy fed back from the motor to the motor driving system is increased, wherein the descent speed of the frequency value is lower than or equal to the descent speed of the frequency value that is adjusted according to the preset deceleration time period.

7. The motor deceleration method according to claim 1, wherein the preset current level is defined as a specified percentage of a rated current of the motor driver.

8. A motor driving system for driving a motor, the motor driving system comprising:
a converter electrically connected with the motor for generating a driving signal to drive the motor, wherein the driving signal contains a voltage value, a current value and a frequency value;
a voltage-regulator capacitor electrically connected with an input terminal of the converter;
a current sensor electrically connected with an output terminal of the converter for sensing the current value and generating a current detecting signal;
a main controller electrically connected with the converter for outputting a control signal to control the converter; and a traction energy controller electrically connected with the current sensor and the main controller, wherein when a deceleration of the motor is launched by the main controller, the traction energy controller issues a voltage compensation value to the main controller according to a result of comparing the current detecting signal with a preset current level, so that the voltage value of the driving signal is increased by the main controller and the current value is increased to the preset current level, wherein when the deceleration of the motor is launched, the traction energy controller further provides a frequency compensation value to the main controller, so that the frequency value is correspondingly changed by the main controller, wherein according to the frequency compensation value, an electrical energy is fed back from the motor to the motor driving system to adjust a DC voltage of the voltage-regulator capacitor, so that the voltage value is increased and the current value is correspondingly increased to and maintained at the preset current level,
wherein if the current value fails to be maintained at the preset current level according to the frequency compensation value and the voltage compensation value, the voltage compensation value is gradually decreased to zero, so that a rotating speed of the motor is decreased to a preset speed.

9. The motor driving system according to claim 8, wherein the traction energy controller comprises a current controller, and the current controller is electrically connected with the current sensor, wherein when the deceleration of the motor is launched, the current controller receives the preset current level and the current detecting signal, and issues the corresponding voltage compensation value.

10. The motor driving system according to claim 9, wherein when the deceleration of the motor is launched, if the current value is lower than the preset current level, the voltage compensation value is gradually increased by the current controller.

11. The motor driving system according to claim 10, wherein when the deceleration of the motor is launched, if the current value reaches the preset current level, the voltage compensation value is no longer increased by the current controller.

12. The motor driving system according to claim 8, wherein the traction energy controller comprises a frequency compensator, and the frequency compensator is electrically connected with the main controller, wherein when the deceleration of the motor is launched, the frequency compensator issues the frequency compensation value.

13. The motor driving system according to claim 12, wherein when the deceleration of the motor is launched, if the current value is lower than the preset current level, the frequency compensation value is decreased by the frequency compensator, so that a descent speed of the frequency value is increased.

14. The motor driving system according to claim 8, wherein if the current value fails to be maintained at the preset current level according to the frequency compensation value, the frequency compensation value is decreased and the descent speed of the frequency value is increased, so that the electrical energy fed back from the motor to the motor driving system is increased.

* * * * *